US008879102B2

(12) United States Patent
Saka

(10) Patent No.: US 8,879,102 B2
(45) Date of Patent: Nov. 4, 2014

(54) IMAGE PROCESSING SYSTEM INCLUDING FIRST IMAGE PROCESSING IMAGE PROCESSING APPARATUS AND DISPLAY DEVICE

(75) Inventor: Masaaki Saka, Toyohashi (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 181 days.

(21) Appl. No.: 13/489,765

(22) Filed: Jun. 6, 2012

(65) Prior Publication Data
US 2012/0320418 A1 Dec. 20, 2012

(30) Foreign Application Priority Data

Jun. 16, 2011 (JP) ................................ 2011-134343

(51) Int. Cl.
G06F 3/12 (2006.01)
H04N 1/32 (2006.01)
H04N 1/00 (2006.01)

(52) U.S. Cl.
CPC ....... *H04N 1/00347* (2013.01); *H04N 1/00493* (2013.01); *H04N 2201/0013* (2013.01); *H04N 2201/3295* (2013.01); *H04N 1/00496* (2013.01); *H04N 2201/0074* (2013.01); *H04N 1/00411* (2013.01); *H04N 2201/0039* (2013.01); *H04N 1/00474* (2013.01); *H04N 1/00538* (2013.01); *H04N 1/32363* (2013.01); *H04N 1/00419* (2013.01); *H04N 1/0023* (2013.01); *H04N 1/00482* (2013.01); *H04N 1/00204* (2013.01)
USPC ........ 358/1.15; 358/1.16; 358/1.13; 718/100; 709/212; 709/213; 709/216

(58) Field of Classification Search
CPC . G03F 15/6552; G06F 3/1238; G06F 3/1259; H04N 1/00129; H04N 1/00204; H04N 1/0023; H04N 1/00233; H04N 1/00007; H04N 1/00347; H04N 1/00411; H04N 1/00408; H04N 1/00482; H04N 1/00493; H04N 1/00496; H04N 1/00538; H04N 1/32363
USPC ........ 358/1.11–1.18, 538; 348/207.99, 207.1, 348/207.11, 207.2; 710/8–20; 709/201–219
See application file for complete search history.

(56) References Cited

U.S. PATENT DOCUMENTS 6,130,757 A * 10/2000 Yoshida et al. .............. 358/1.15
8,437,050 B2    5/2013 Tochigi et al.
(Continued)

FOREIGN PATENT DOCUMENTS

JP  2003-163785 A  6/2003
JP  2006-287805 A  10/2006
(Continued)

OTHER PUBLICATIONS

Office Action (Notice of Grounds of Rejection) issued on Oct. 15, 2013, by the Japanese Patent Office in corresponding Japanese Patent Application No. 2011-134343. (2 pages).

*Primary Examiner* — Chad Dickerson
(74) *Attorney, Agent, or Firm* — Buchanan Ingersoll & Rooney PC

(57) ABSTRACT

An image processing system includes a first MFP (Multi-Function Peripheral), a second MFP, and an operation panel. The operation panel is attachable to and removable from each of the first and second MFPs. The first MFP accepts a job. The operation panel includes a storage unit for storing information held by the first MFP and a display unit for displaying information about the job accepted by the first MFP. The second MFP executes the job accepted by the first MFP based on the information stored in the storage unit of the operation panel when the operation panel is removed from the first MFP and attached to the second MFP.

11 Claims, 14 Drawing Sheets

(56) References Cited

U.S. PATENT DOCUMENTS

2006/0048234 A1* 3/2006 Imaizumi et al. ............... 726/27
2007/0035791 A1* 2/2007 Shimura ....................... 358/538
2008/0282065 A1* 11/2008 Imamichi ...................... 712/208
2009/0046159 A1* 2/2009 Okamoto ................. 348/207.99

FOREIGN PATENT DOCUMENTS

| JP | 2009-104234 A | | 5/2009 |
| --- | --- | --- | --- |
| JP | 2009104234 A | * | 5/2009 |
| JP | 2010-85801 A | | 4/2010 |
| JP | 20100085801 A | * | 4/2010 |

* cited by examiner

IMAGE PROCESSING SYSTEM INCLUDING FIRST IMAGE PROCESSING IMAGE PROCESSING APPARATUS AND DISPLAY DEVICE

This application is based on Japanese Patent Application No. 2011-134343 filed with the Japan Patent Office on Jun. 16, 2011, the entire content of which is hereby incorporated by reference.

BACKGROUND OF THE INVENTION

1. Field of the Invention

The present invention relates to an image processing system, and more particularly to an image processing system including a first image processing system, a second image processing system, and a display device.

2. Description of the Related Art

Electrophotographic image forming apparatuses include MFPs (Multi-Function Peripherals) having a scanner function, a facsimile function, a copy function, a printer function, a data communication function, and a server function, facsimile machines, copiers, and printers.

A technique for transferring a job registered in an MFP to another MFP to allow another MFP to process the job is conventionally known. For example, Document 1 below discloses a technique in which image data and job information in an MFP is stored in a portable memory, and the contents stored in the portable memory are read out in another MFP for processing a job. In this technique, in a case where facsimile transmission to a destination terminal is failed even after a prescribed number of retransmission processes, the MFP stores image data and destination facsimile number information into a USB memory connected to the MFP. When the USB memory storing those data is connected to an MFP, the MFP to which the USB memory is connected executes facsimile transmission of the image data.

Document 2 below discloses a network image forming system in which a job being executed in an MFP is transferred to another MFP connected on a network for processing. In this network image forming system, the MFP has a function of successively grasping the operational states of another MFP. The MFP displays on its panel that an MFP not being used is present when a prescribed MFP now in an image forming operation is to perform a new image forming operation. The MFP transfers image data read by the prescribed MFP to another MFP not being used.

Document 1: Japanese Laid-Open Patent Publication No. 2006-287805

Document 2: Japanese Laid-Open Patent Publication No. 2003-163785

However, the conventional techniques have a problem of poor operability. For example, when a job is transferred using a USB memory as in Document 1, the user has to select a job and image data to be used in the job on the operation panel both at an MFP from which the job is transferred and at an MFP to which the job is transferred. When image data is transferred as in Document 2, the user has to select a job to be transferred on an operation panel and search for an MFP to which a job is to be transferred from among a plurality of MFPs on a network. In either technique, several steps of inputs and settings on the operation panel are required, which takes time and efforts for the users. Moreover, some users may not be able to find a setting screen on the operation panel or may not know how to operate the operation panel. In those cases, the users cannot perform the operation of transferring a job.

SUMMARY OF THE INVENTION

An object of the present invention is to provide an image processing system with improved operability.

An image processing system according to an aspect of the present invention includes a first image processing apparatus, a second image processing apparatus, and a display device. The display device is attachable to and removable from each of the first image processing apparatus and the second image processing apparatus. The first image processing apparatus includes an accepting unit for accepting a job. The display device includes a storage unit for storing information held by the first image processing apparatus and a display unit for displaying information about a job accepted by the accepting unit. The second image processing apparatus includes a job execution unit for executing the job accepted by the accepting unit based on the information stored in the storage unit when the display device is removed from the first image processing apparatus and attached to the second image processing apparatus.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Embodiments of the present invention will be described below based on the figures.

An image processing system described below is a system including image forming apparatuses (an example of an image processing apparatus) which perform image formation by an electrophotographic or electrostatic recording technique. The image forming apparatus in the present embodiment may be an MFP having a scanner function, a facsimile function, a copy function, a printer function, a data communication function, and a server function, or a facsimile machine, a copier, a printer, or the like. The image processing apparatus may be any device other than an image forming apparatus, for example, a PC (Personal Computer) or a scanner.

First Embodiment

First of all, an overall configuration of the image processing system in the present embodiment is described.

Figure 1:
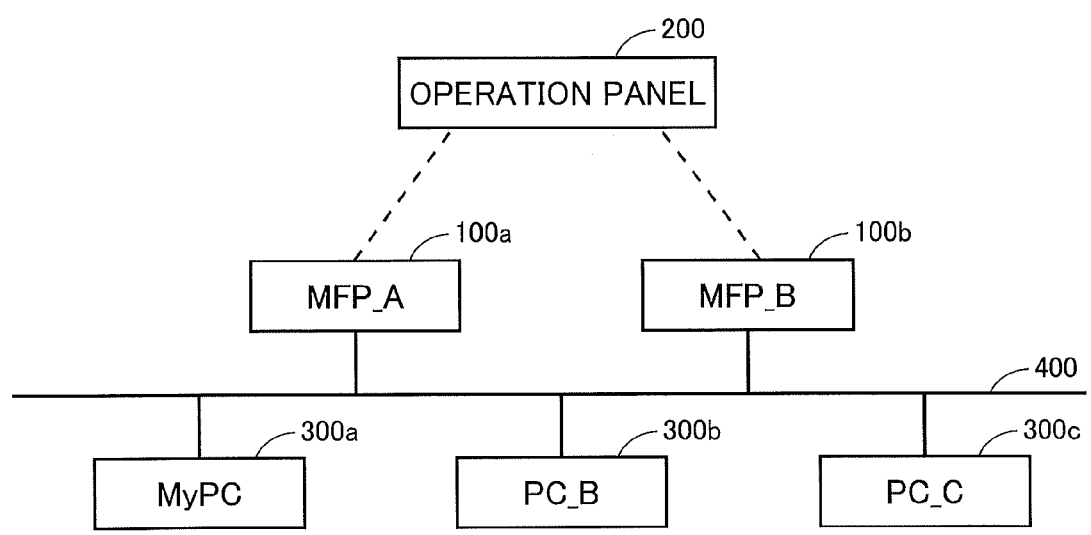
FIG. 1 is a diagram showing an overall configuration of an image processing system in a first embodiment of the present invention.

Referring to FIG. 1, the image processing system includes an MFP 100a (MFP_A) and an MFP 100b (MFP_B) (MFPs 100a and 100b may also be collectively referred to as MFP 100 hereinafter), an operation panel 200 as a display device, and a PC 300a (MyPC), a PC 300b (PC_B) and a PC 300c (PC_C) (PCs 300a, 300b and 300c may also be collectively referred to as PC 300 hereinafter). A plurality of MFPs 100 are mutually connected via a network 400. A plurality of MFPs 100 and a plurality of PCs 300 are mutually connected via network 400.

Network 400 is a wired or wireless LAN (Local Area Network). Network 400 connects a variety of equipment using a protocol such as TCP/IP (Transmission Control Protocol/Internet Protocol). The equipment connected to network 400 can mutually exchange various data. In place of network 400, a wide area network such as the Internet or a dedicated network may be used to connect the equipment.

Operation panel 200 can be attached to and removed from each of MFPs 100a and 100b. The master unit of operation panel 200 is MFP 100a, and operation panel 200 is capable of wired communication and wireless communication with MFP 100a. When operation panel 200 is attached to MFP 100a (wired connection), operation panel 200 serves as a local panel for MFP 100a and accepts an operation on MFP 100a. When operation panel 200 is removed from MFP 100a, operation panel 200 operates as a remote panel for MFP 100a. In other words, operation panel 200 transmits information as to the accepted operation on MFP 100a to MFP 100a via wireless communication. When operation panel 200 is removed from MFP 100a and attached to MFP 100b, operation panel 200 can communicate with MFP 100b by wire. In this case, operation panel 200 operates as a remote panel for MFP 100a and a partial local panel for MFP 100b. Here, the partial local panel means the capability of operating MFP 100b in connection with a job stored in operation panel 200.

It is noted that the operation panel does not have to be able to wirelessly communicate with MFP 100a. MFP 100b may not be connected to network 400 and may be stand-alone.

Figure 2:
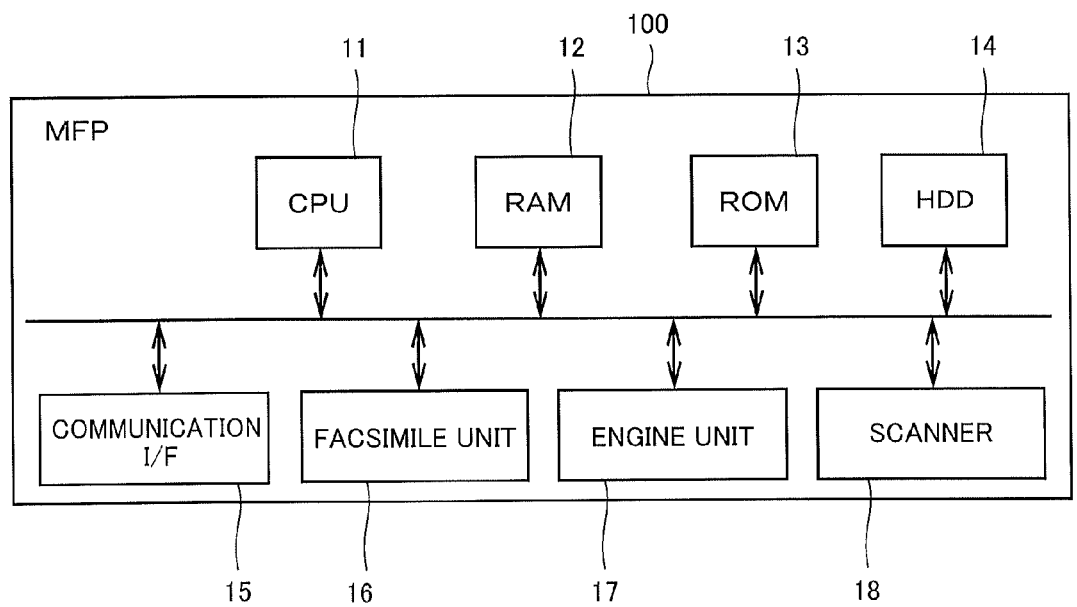
FIG. 2 is a block diagram schematically showing a configuration of an MFP 100 shown in FIG. 1.

FIG. 2 is a block diagram schematically showing a configuration of MFP 100 shown in FIG. 1.

Referring to FIG. 2, MFP 100 includes, for example, a CPU (Central Processing Unit) 11, a RAM (Random Access Memory) 12, a ROM (Read Only Memory) 13, an HDD (Hard Disk Drive) 14, a communication I/F 15, a facsimile unit 16, an engine unit 17, and a scanner 18.

CPU 11 controls MFP 100 on the whole for a variety of jobs such as a scan job, a copy job, a mail transmission job, and a print job. CPU 11 executes a control program for MFP 100 that is stored in ROM 13. CPU 11 reads data from RAM 12, ROM 13, or HDD 14 or writes data into RAM 12, ROM 13, or HDD 14 through prescribed processing.

RAM 12 is a main memory of CPU 11. RAM 12 is used to store data required when CPU 11 executes the control program.

ROM 13 is, for example, a flash ROM (Flash Memory). A variety of programs for performing operations of MFP 100 are stored in ROM 13. ROM 13 may be a non-rewritable one.

HDD 14 is a storage device for storing data of an image sent from an external device through communication I/F 15, data of a document image scanned by scanner 18, and the like.

Communication I/F 15 communicates with external devices such as another MFP and a client PC via the LAN using a communication protocol such as TCP/IP in accordance with an instruction from CPU 11.

Facsimile unit 16 transmits/receives data to/from another device via a communication line.

Engine unit 17 mainly includes a toner image forming unit, a fixing device, and a paper conveyance unit. Engine unit 17 forms an image on paper, for example, by an electrophotographic technique. Engine unit 17 is a tandem system configured such that four color images can be combined and formed on paper (recording medium). The toner image forming unit mainly includes photoconductors for C (cyan), M (magenta), Y (yellow), and K (black), an intermediate transfer belt to which toner images from the photoconductors are transferred (primary transfer), and a transfer unit for transferring images from the intermediate transfer belt to paper (secondary transfer). The fixing device has a heating roller and a pressing roller. The fixing device conveys paper with a toner image sandwiched between the heating roller and the pressing roller, and heats and presses the paper. The fixing device thus fuses toner adhered to the paper and fixes the toner on the paper thereby forming an image on the paper. The paper conveyance unit mainly includes a paper feed roller, a conveyance roller, and a motor for driving them. The paper conveyance unit feeds paper from a paper feed cassette and conveys paper in the inside of the casing of MFP 100. The paper conveyance unit discharges paper having an image formed thereon from the casing of MFP 100 to a paper output tray.

Scanner 18 scans an image on a document and coverts the image into image data which is electronic data.

Figure 3:
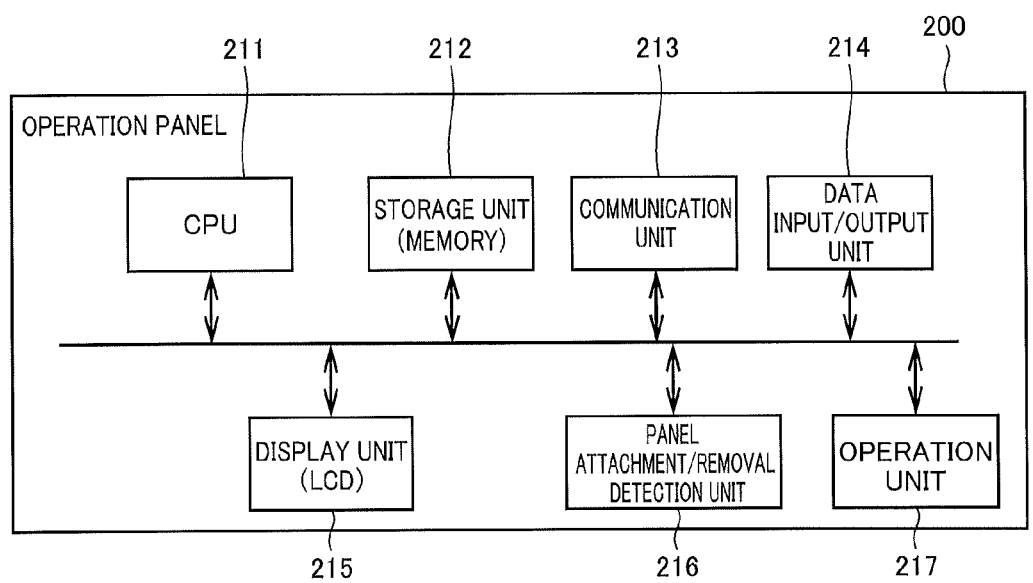
FIG. 3 is a block diagram schematically showing a hardware configuration of an operation panel 200 shown in FIG. 1.

FIG. 3 is a block diagram schematically showing a hardware configuration of operation panel 200 shown in FIG. 1.

Referring to FIG. 3, operation panel 200 includes a CPU 211, a storage unit 212, a communication unit 213, a data input/output unit 214, a display unit 215, a panel attachment/removal detection unit 216, and an operation unit 217. These units are connected with each other, for example, though a bus.

CPU 211 performs control on operation panel 200 in accordance with a program stored in storage unit 212.

Storage unit 212 stores a variety of programs for operations of operation panel 200 and data required when CPU 211 executes a program.

Storage unit 212 stores information held by MFP 100a. Storage unit 212 may store, for example, machine information (for example, the IP address of MFP 100a) which is identification information of MFP 100a, and job information which is information about a job accepted by MFP 100a. For example, storage unit 212 may not store job information but may store machine information. Storage unit 212 may additionally store job information and image data necessary for a job.

The machine information can include, for example, a device code, a host name, an IP address, and an attachment option of MFP 100a. The job information can include, for example, a job kind (copy, print, and the like), a job status, a job identification code (process ID), the name of a user who executes a job, and a job priority.

Communication unit 213 connects operation panel 200 and MFP 100a wirelessly when operation panel 200 is removed from MFP 100a. When attached to MFP 100a or MFP 100b, communication unit 213 connects the attached MFP 100 by wire.

Data input/output unit 214 performs data input/output to/from each of MFP 100a and MFP 100b. Specifically, data input/output unit 214 performs input/output of machine information, job information, or image data necessary for a job.

Display unit 215 is, for example, an LCD (Liquid Crystal Display) to display a variety of information about MFP 100a or MFP 100b. Specifically, display unit 215 displays information (for example, a list of jobs) about a job accepted by MFP 100a serving as the master unit.

Panel attachment/removal detection unit 216 detects attachment/removal of operation panel 200 to/from MFP 100.

Operation unit 217 accepts an operation on each of MFP 100a and MFP 100b through a touch panel provided on display unit 215.

Figure 4:
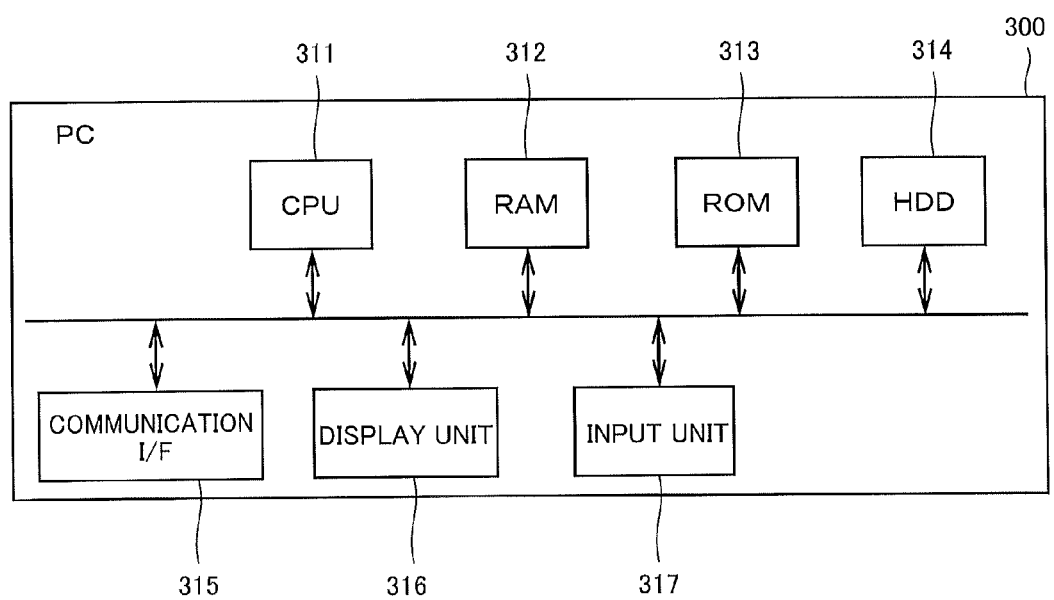
FIG. 4 is a block diagram schematically showing a configuration of a PC 300 shown in FIG. 1.

FIG. 4 is a block diagram schematically showing a configuration of PC 300 shown in FIG. 1.

Referring to FIG. 4, PC 300 includes a CPU 311, a RAM 312, a ROM 313, an HDD 314, a communication I/F 315, a display unit 316, and an input unit 317.

In the image processing system in the present embodiment, operation panel 200 stores information held by MFP 100a. When operation panel 200 is removed from MFP 100a and attached to MFP 100b, MFP 100b executes a job accepted by MFP 100a based on the information stored by operation panel 200.

An operation of the image processing system in the present embodiment will now be described.

Figure 5:
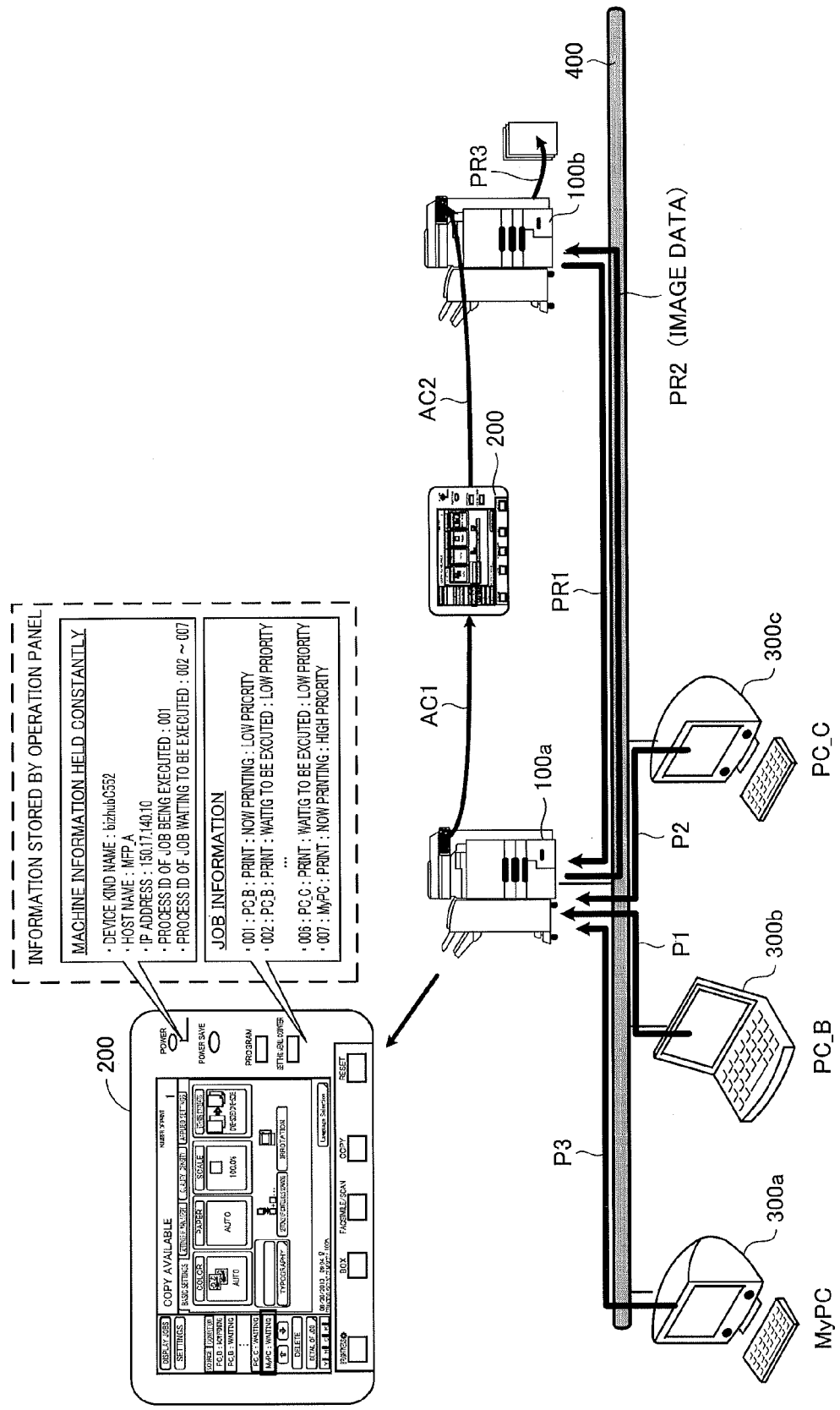
FIG. 5 is a diagram conceptually showing an operation of the image processing system when a job is transferred from an MFP 100a to an MFP 100b in the first embodiment of the present invention.

FIG. 5 is a diagram conceptually showing an operation of the image processing system when a job is transferred from MFP 100a to MFP 100b in the first embodiment of the present invention.

Referring to FIG. 5, MFPs 100a and 100b and PCs 300a to 300c are connected to network 400. Operation panel 200 is initially attached to MFP 100a.

Operation panel 200 stores the machine information of MFP 100a and job information accepted by MFP 100a in storage unit 212.

MFP 100a stores the job information accepted by MFP 100a and image data necessary for the job in HDD 14.

The machine information of MFP 100a includes, for example, the device kind name, the host name, and the IP address. The machine information may additionally include a process ID of a job being executed in MFP 100a and a process ID of a job waiting to be executed.

MFP 100a accepts five print jobs P1 (print request) from PC 300b. MFP 100a accepts one print job P2 following print job P1 from PC 300c. MFP 100a accepts one print job P3 following print job P2 from PC 300a. When accepting a job, MFP 100a stores the job information and the necessary image data for the job into HDD 14 of MFP 100a. When accepting a job, MFP 100a also stores the job information of the job into storage unit 212 of operation panel 200.

The job information held by MFP 100a and operation panel 200 includes job information of a job being executed in MFP 100a and a job waiting to be executed in MFP 100a. The job information includes a process ID, which is a number assigned in the accepted order, a transmission source of the job, the kind of the job, the present status of the job, and the priority of the job. In FIG. 5, the jobs accepted from PC 300b are given process IDs "001" to "005," the job accepted from PC 300c is given a process ID "006," and the job accepted from PC 300a is given a process ID "007." For example, the job having the process ID "001" is a print job accepted from PC 300b, which is a job now being executed and having a low priority.

When MFP 100a is in a state shown in FIG. 5, for example, the user (hereinafter also referred to as "working user") of PC 300a who registers a job most recently looks at a list of jobs on display unit 215 and knows that a lot of jobs have already been registered prior to the job of print request made by that user and that it takes time for MFP 100a to execute the job of print request made by that user.

In this situation, the working user can transfer the job transmitted to MFP 100a to MFP 100b for execution, by performing three steps below.

Step A: as shown by the arrow AC1, remove operation panel 200 from MFP 100a (the MFP from which the panel is removed).

Step B: carry operation panel 200 to MFP 100b.

Step C: as shown by the arrow AC2, attach (connect) operation panel 200 to MFP 100b (the MFP to which the panel is attached).

Operation panel 200, when being attached to MFP 100a, updates the job information in storage unit 212 in real time based on the job information received from MFP 100a via wired communication (communication between the main unit and the panel). Operation panel 200, when being removed from MFP 100a, updates the job information in storage unit 212 in real time based on the job information received from MFP 100a via wireless communication (communication between the main unit and the panel). Specifically, when printing of the job having the process ID "001" is completed, the indication "now printing" in the job information having the process ID "001" is changed to "printing done" (or the job information having the process ID "001" may be deleted). Image data used in the job having the process ID "001" is deleted from HDD 14 of MFP 100a. In the case where operation panel 200 is removed from MFP 100a, operation panel 200 may display the job information of the job accepted at MFP 100a on display unit 215.

When detecting that operation panel 200 is attached, MFP 100b automatically reads out (acquires) the machine information of MFP 100a that is held by operation panel 200. Then, MFP 100b accesses MFP 100a based on the read machine information, as shown by the arrow PR1, and starts communication with MFP 100a via network 400.

In addition, when detecting that operation panel 200 is attached, MFP 100b automatically reads out the job information of MFP 100a that is held in storage unit 212. Then, MFP 100b executes the print job based on the job information read from operation panel 200 and outputs paper as shown by the arrow PR3. Here, MFP 100b acquires image data necessary for the print job from MFP 100a as shown by the arrow PR2.

After execution of the print job, MFP 100b requests MFP 100a to delete the image data of the job executed in MFP 100b. MFP 100a then deletes the image data from HDD 14 of MFP 100a in accordance with the request from MFP 100b.

Figure 6:
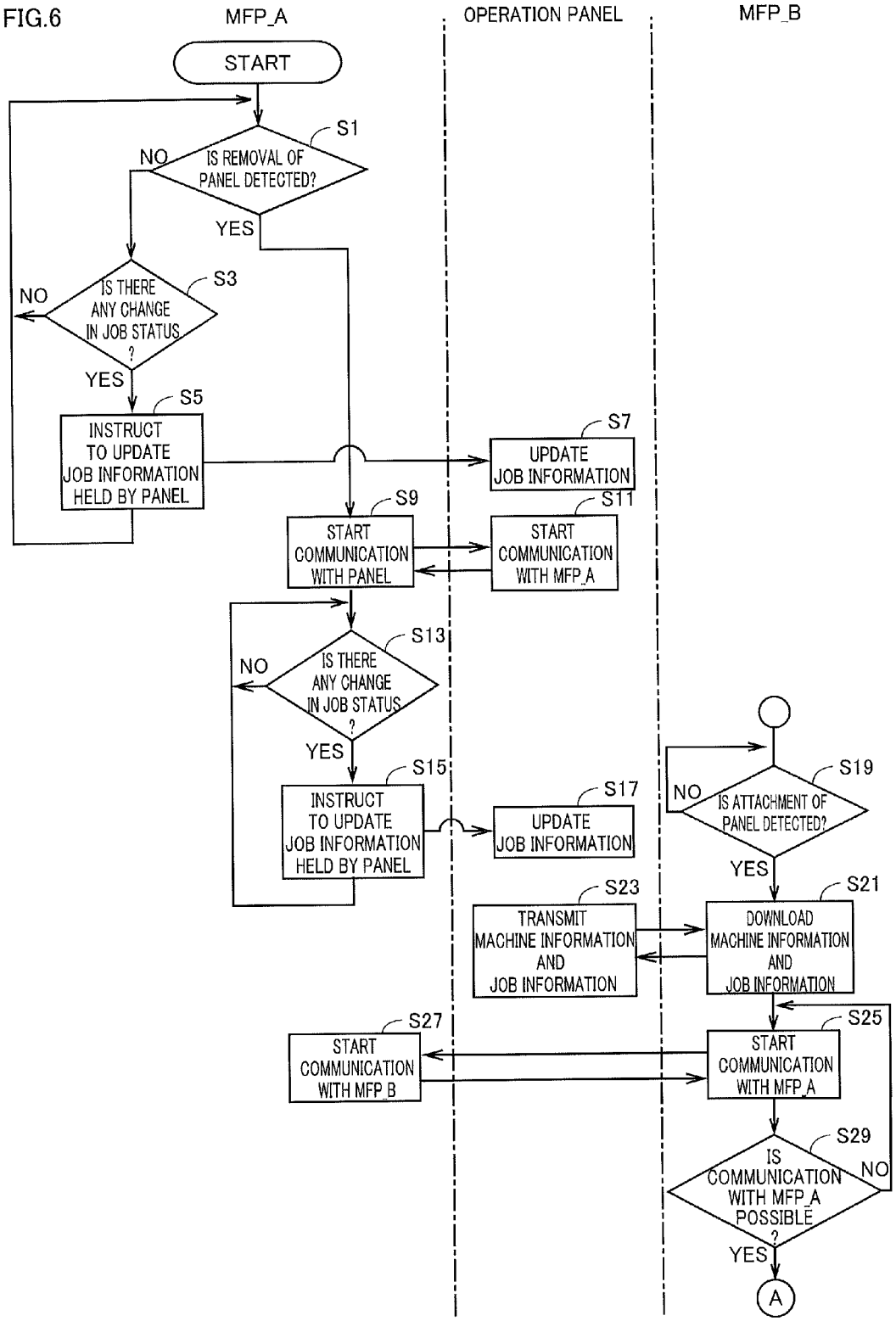
FIG. 6 and FIG. 7 are flowcharts showing the operation of the image processing system when a job is transferred from MFP 100a to MFP 100b in the first embodiment of the present invention.
Figure 7:
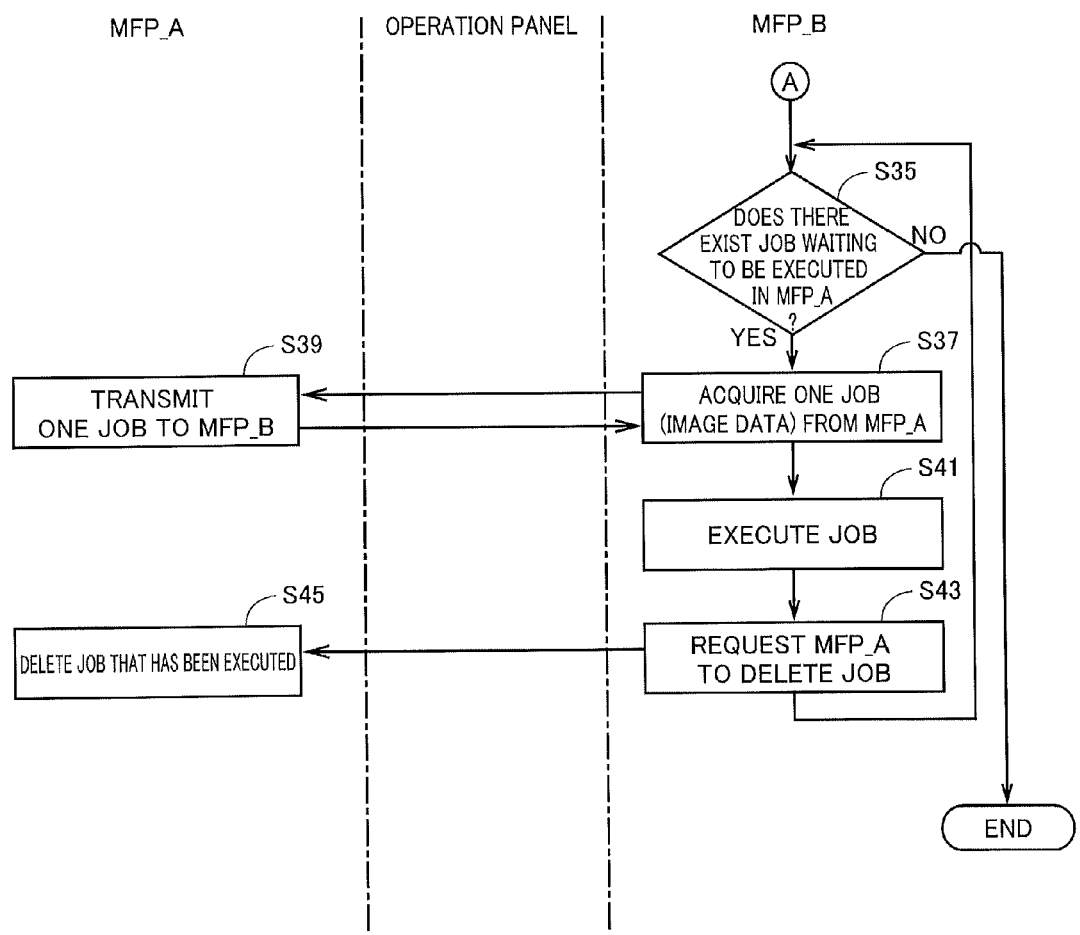

FIG. 6 and FIG. 7 are flowcharts showing the operation of the image processing system when a job is transferred from MFP 100a to MFP 100b in the first embodiment of the present invention.

Referring to FIG. 6, CPU 11 of MFP 100a (hereinafter also referred to as CPU 11a) determines whether removal of operation panel 200 from MFP 100a is detected (S1). If it is determined that removal of operation panel 200 is not detected (NO in S1), CPU 11a determines whether there is any change in the job status of MFP 100a (S3).

In step S3, if it is determined that there is a change in the job status (YES in S3), CPU 11a instructs operation panel 200 to update the job information held by operation panel 200 (S5) and proceeds to the process in step S1. CPU 211 of operation panel 200 updates the job information in accordance with the instruction (S7). On the other hand, in step S3, if it is determined that there is no change in the job status (NO in S3), CPU 11a proceeds to the process in step S1.

In step S1, if it is determined that removal of operation panel 200 is detected (YES in S1), CPU 11a starts wireless communication with operation panel 200 (S9). CPU 211 starts wireless communication with MFP 100a (S11). Then, CPU 11a determines whether there is any change in the job status of MFP 100a (S13).

In step S13, if it is determined that there is a change in the job status (YES in S13), CPU 11a instructs operation panel 200 to update the job information held by operation panel 200 (S15) and proceeds to the process in S13. CPU 211 of operation panel 200 updates the job information in accordance with the instruction (S17). On the other hand, in step S13, if it is determined that there is no change in the job status (NO in S13), CPU 11a repeats the process in step S13.

CPU 11 of MFP 100b (hereinafter also referred to as CPU 11b) determines whether attachment of operation panel 200 to MFP 100b is detected (S19). If it is determined that attachment of operation panel 200 is detected (YES in S19), CPU 11b downloads the machine information and the job information held by operation panel 200 from operation panel 200 (S21). CPU 211 transmits the machine information and the job information held by operation panel 200 to MFP 100b in accordance with the request from MFP 100b (S23). Then, CPU 11b specifies MFP 100a based on the downloaded machine information and starts communication with MFP 100a (S25). CPU 11a also starts communication with MFP 100b (S27). Then, CPU 11b determines whether communication with MFP 100a is possible (S29).

In step S29, if it is determined that communication with MFP 100a is possible (YES in S29), CPU 11b proceeds to the process in step S35 in FIG. 7. In step S29, if it is determined that communication with MFP 100a is not possible (NO in S29), CPU 11b proceeds to the process in step S25 and retries communication.

Referring to FIG. 7, in step S35, CPU 11b determines whether there exists a job waiting to be executed in MFP 100a, based on the downloaded job information (S35).

In step S35, if it is determined that there exists a job waiting to be executed in MFP 100a (YES in S35), CPU 11b acquires one of the jobs waiting to be executed (image data necessary for the job) from MFP 100a (S37). CPU 11a transmits the requested job to MFP 100b in accordance with the request from MFP 100b (S39). Then, CPU 11b executes the job based on the downloaded job information and image data (S41), requests MFP 100a to delete the job that has been executed (S43), and proceeds to the process in step S35. CPU 11a deletes the job that has been executed from HDD 11 of MFP 100a in accordance with the request (S45).

In step S35, if it is determined that there exists no job waiting to be executed in MFP 100a (NO in S35), CPU 11b terminates the process.

Second Embodiment

The present embodiment differs from the first embodiment in that operation panel 200 does not store job information accepted at MFP 100a but MFP 100b acquires job information from MFP 100a.

Figure 8:
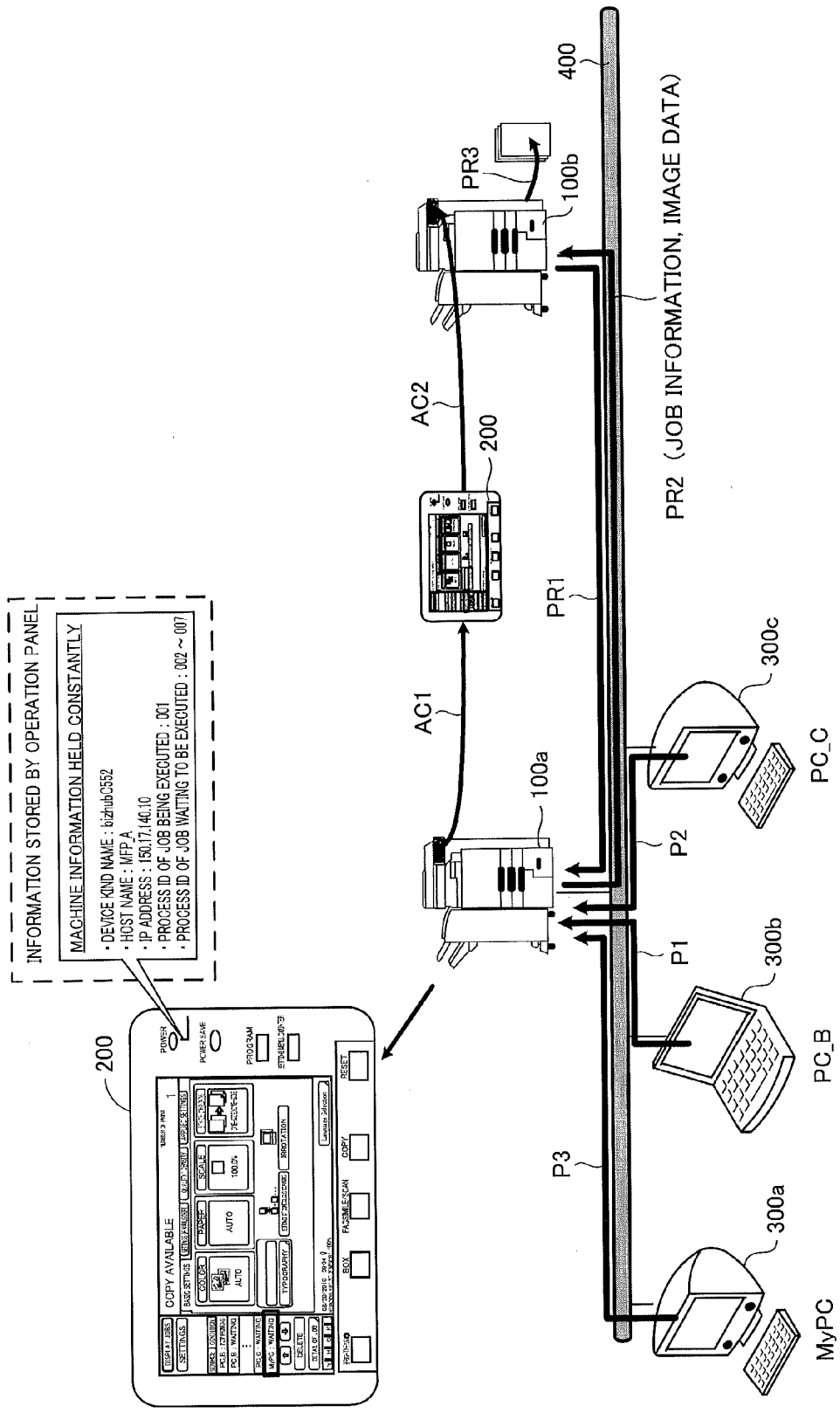
FIG. 8 is a diagram conceptually showing an operation of the image processing system when a job is transferred from MFP 100a to MFP 100b in a second embodiment of the present invention.

FIG. 8 is a diagram conceptually showing an operation of the image processing system when a job is transferred from MFP 100a to MFP 100b in the second embodiment of the present invention.

Referring to FIG. 8, MFPs 100a and 100b and PCs 300a to 300c are connected to network 400. Operation panel 200 is initially attached to MFP 100a.

Operation panel 200 stores the machine information of MFP 100a but does not store the job information accepted at MFP 100a.

MFP 100a stores the job information accepted at MFP 100a and the image data necessary for the job in HDD 14.

MFP 100a accepts print jobs P1 to P3 from PC 300b, PC 300c, and PC 300a, respectively, and stores the job information and the necessary data for these print jobs in HDD 14, in a similar manner as in the first embodiment. A list of jobs accepted by MFP 100a is displayed on display unit 215 of operation panel 200 under the control of CPU 11 of MFP 100a.

In this situation, the working user removes operation panel 200 from MFP 100a as shown by the arrow AC1 (step A), carries operation panel 200 to MFP 100b (step B), and attaches operation panel 200 to MFP 100b as shown by the arrow AC2 (step C), thereby transferring the job transmitted to MFP 100a to MFP 100b and executing the transferred job.

Operation panel 200, when being attached to MFP 100a, updates the job information in storage unit 212 in real time based on the job information received from MFP 100a via wired communication (communication between the main unit and the panel). Operation panel 200, when being removed from MFP 100a, updates the job information in storage unit 212 in real time based on the job information received from MFP 100a via wireless communication (communication between the main unit and the panel).

When detecting that operation panel 200 is attached, MFP 100b automatically reads out (acquires) the machine information of MFP 100a that is held by operation panel 200. Then, MFP 100b accesses MFP 100a based on the read machine information, as shown by the arrow PR1, and starts communication with MFP 100a via network 400. Then, MFP 100b acquires the job information stored in HDD 14 of MFP 100a and image data necessary for the print job from MFP 100a as shown by the arrow PR2. Then, MFP 100b executes the print job based on the job information acquired from MFP 100a and outputs paper as shown by the arrow PR3.

After execution of the print job, MFP 100b requests MFP 100a to delete the image data of the print job executed in MFP 100b. MFP 100a then deletes the image data from HDD 14 in accordance with the request from MFP 100b.

Figure 9:
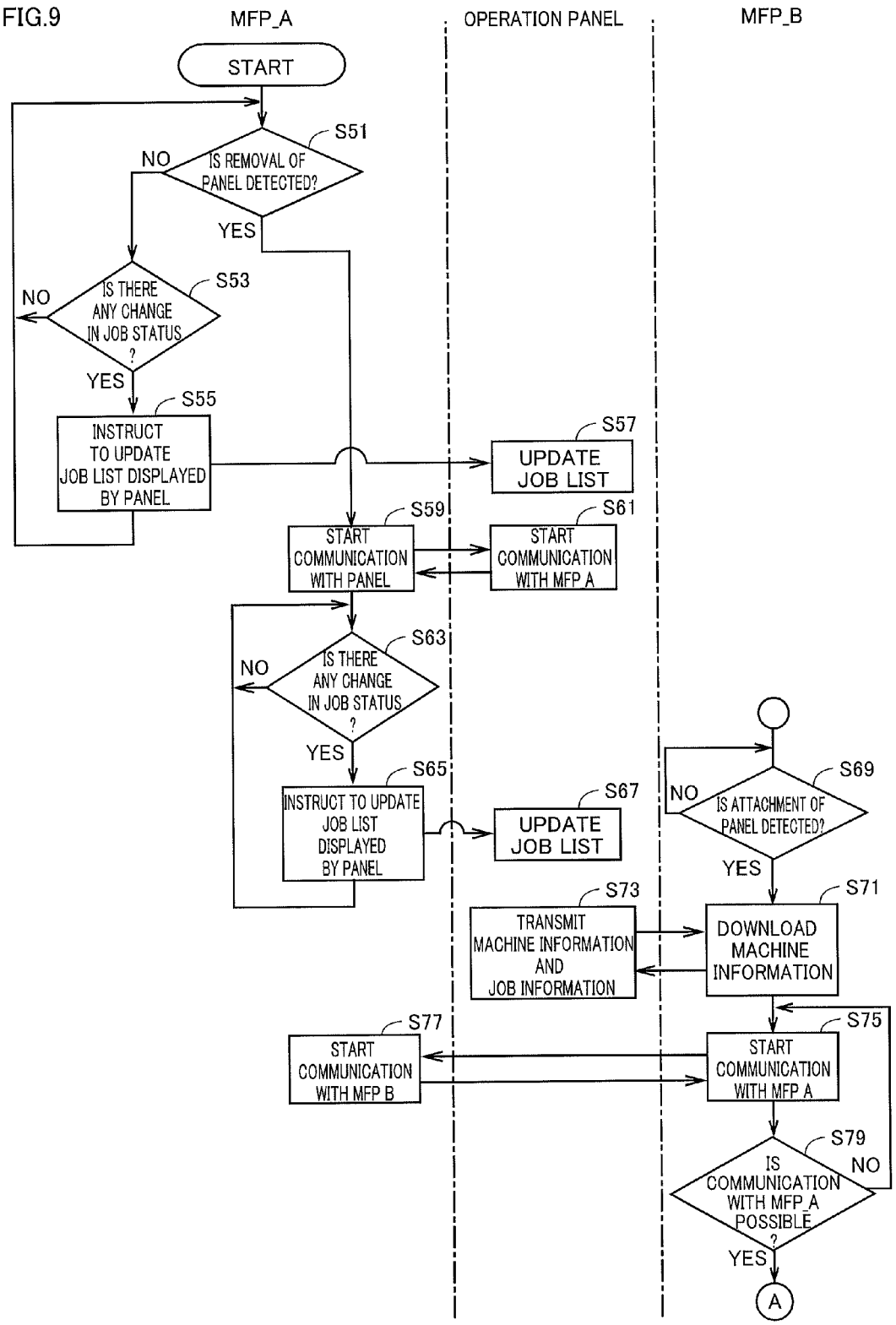
FIG. 9 and FIG. 10 are flowcharts showing the operation of the image processing system when a job is transferred from MFP 100a to MFP 100b in the second embodiment of the present invention.
Figure 10:
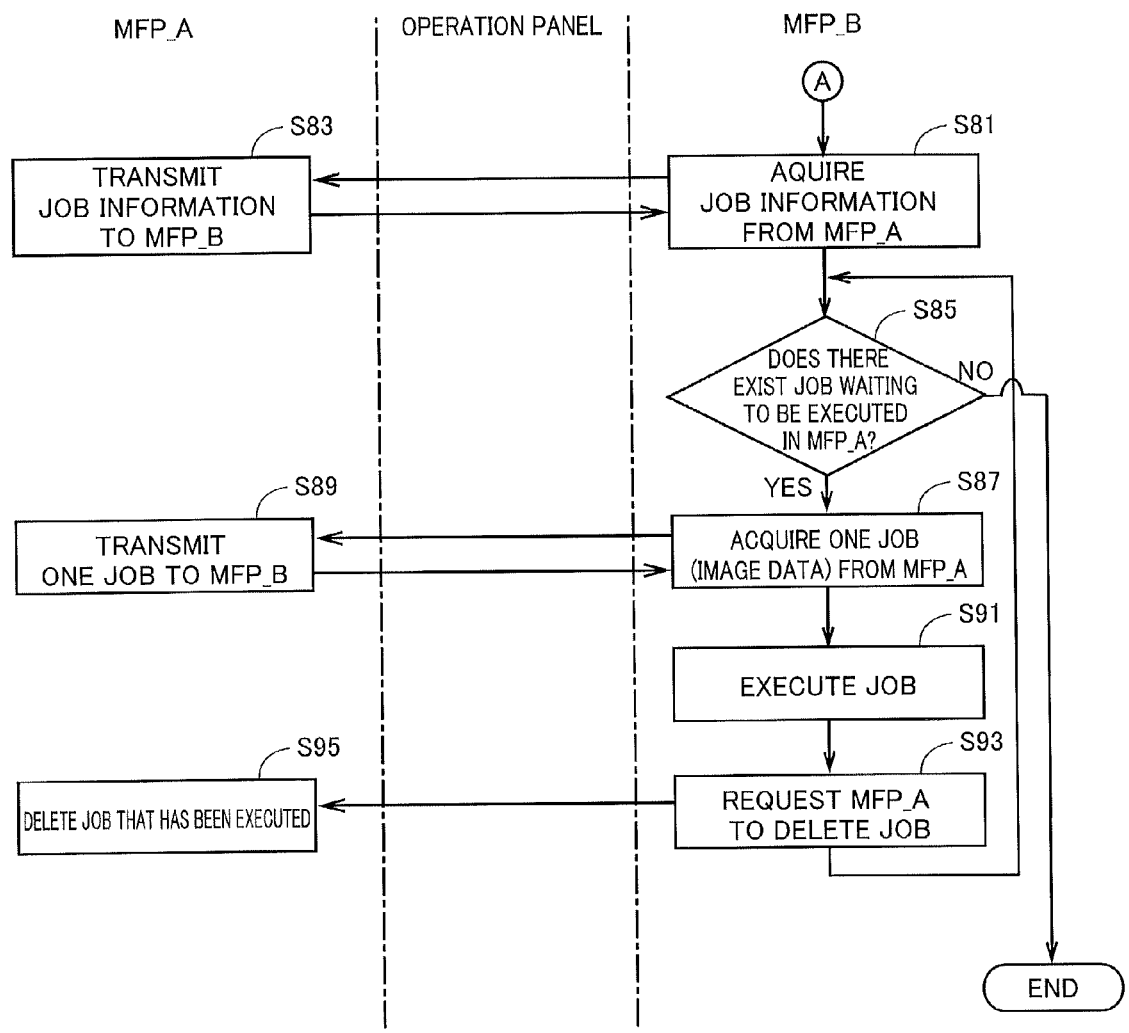

FIG. 9 and FIG. 10 are flowcharts showing the operation of the image processing system when a job is transferred from MFP 100a to MFP 100b in the second embodiment of the present invention.

Referring to FIG. 9, CPU 11a determines whether removal of operation panel 200 from MFP 100a is detected (S51). If it is determined that removal of operation panel 200 is not detected (NO in S51), CPU 11a determines whether there is any change in the job status of MFP 100a (S53).

In step S53, if it is determined that there is a change in the job status (YES in S53), CPU 11a instructs operation panel 200 to update the job list displayed by operation panel 200 (S55) and proceeds to the process in step S51. CPU 211 of operation panel 200 updates the job list in accordance with the instruction (S57). On the other hand, in step S53, if it is determined that there is no change in the job status (NO in S53), CPU 11a proceeds to the process in step S51.

In step S51, if it is determined that removal of operation panel 200 is detected (YES in S51), CPU 11a starts communication with operation panel 200 (S59). CPU 211 starts communication with MFP 100a (S61). Then, CPU 11a determines whether there is any change in the job status of MFP 100a (S63).

In step S63, if it is determined that there is a change in the job status (YES in S63), CPU 11a instructs operation panel 200 to update the job list displayed by operation panel 200 (S65) and proceeds to the process in S63. CPU 211 of operation panel 200 updates the job list in accordance with the instruction (S67). On the other hand, in step S63, if it is determined that there is no change in the job status (NO in S63), CPU 11a repeats the process in step S63.

CPU 11b determines whether attachment of operation panel 200 to MFP 100b is detected (S69). If it is determined that attachment of operation panel 200 is detected (YES in S69), CPU 11b downloads the machine information from operation panel 200 (S71). CPU 211 transmits the machine information held by operation panel 200 to MFP 100b in accordance with the request from MFP 100b (S73). Then, CPU 11b specifies MFP 100a based on the downloaded machine information and starts communication with MFP 100a (S75). CPU 11a also starts communication with MFP 100b (S77). Then, CPU 11b determines whether communication with MIT 100a is possible (S79).

In step S79, if it is determined that communication with MFP 100a is possible (YES in S79), CPU 11b proceeds to the process in step S81 in FIG. 10. In step S79, if it is determined that communication with MFP 100a is not possible (NO in S79), CPU 11b proceeds to the process in step S75 and retries communication.

Referring to FIG. 10, in step S81, CPU 11b downloads the job information from MFP 100a (S81). CPU 11a transmits the job information stored in HDD 14 to MFP 100b in accordance with the request from MFP 100b (S83). Then, CPU 11b determines whether there exists a job waiting to be executed in MFP 100a, based on the downloaded job information (S85).

In step S85, if it is determined that there exists a job waiting to be executed in MFP 100a (YES in S85), CPU 11b acquires one of the jobs (image data necessary for the job) from MFP 100a (S87). CPU 11a transmits the requested job to MFP 100b in accordance with the request from MFP 100b (S89). Then, CPU 11b executes the job based on the acquired job information and image data (S91), requests MFP 100a to delete the job that has been executed (S93), and proceeds to the process in step S85. CPU 11a deletes the job that has been executed in accordance with the request (S95).

In step S85, if it is determined that there exists no job waiting to be executed in MFP 100a (NO in S85), CPU 11b terminates the process.

It is noted that the matters other than those described above including the configuration of the image processing system are similar as in the first embodiment, and therefore a description thereof is not repeated.

Third Embodiment

The present embodiment differs from the first embodiment in that MFP 100b is not connected to network 400.

Figure 11:
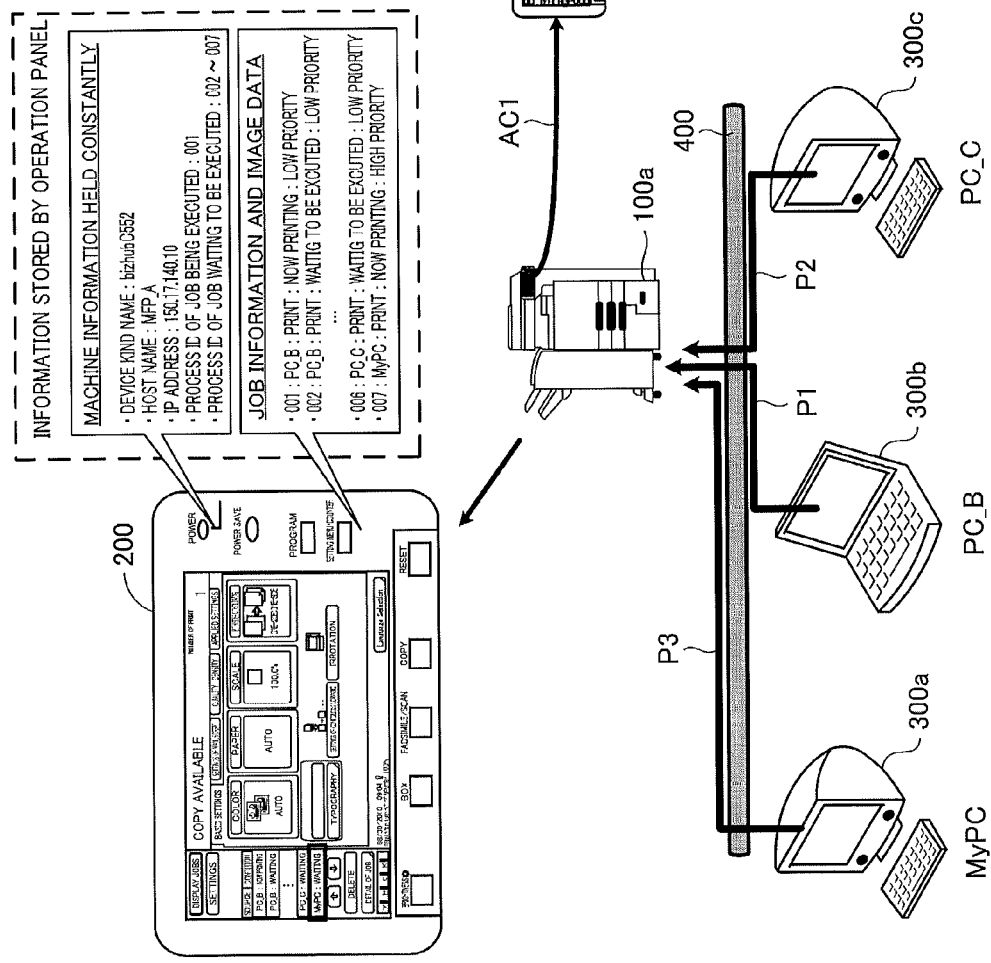
FIG. 11 is a diagram conceptually showing an operation of the image processing system when a job is transferred from MFP 100a to MFP 100b in a third embodiment of the present invention.

FIG. 11 is a diagram conceptually showing an operation of the image processing system when a job is transferred from MFP 100a to MFP 100b in the third embodiment of the present invention.

Referring to FIG. 11, MFP 100b is not connected to network 400, and MFP 100a and PCs 300a to 300c are connected to network 400. Operation panel 200 is initially attached to MFP 100a.

Operation panel 200 stores the job information, the image data necessary for the job, and the machine information of MFP 100a in storage unit 212.

MFP 100a stores the job information accepted at MFP 100a and the image data necessary for the job in HDD 14.

MFP 100a accepts print jobs P1 to P3 from PC 300b, PC 300c, and PC 300a, respectively, and stores the job information and the necessary data for these print jobs in HDD 14, in a similar manner as in the first embodiment. A list of jobs accepted by MFP 100a is displayed on display unit 215 of operation panel 200 under the control of CPU 11 of MFP 100a.

In this situation, the working user removes operation panel 200 from MFP 100a as shown by the arrow AC1 (step A), carries operation panel 200 to MFP 100b (step B), and attaches operation panel 200 to MFP 100b as shown by the arrow AC2 (step C), thereby transferring the job transmitted to MFP 100a to MFP 100b and executing the transferred job.

In a state in which operation panel 200 is attached to MFP 100a, when accepting a new job, MFP 100a stores the job information of the new job and the image necessary for the job into HDD 14. MFP 100a also copies them into storage unit 212 of operation panel 200. Operation panel 200 updates the job information in storage unit 212 in real time based on the job information received from MFP 100a.

When detecting that operation panel 200 is removed from MFP 100a, MFP 100a deletes the image data copied in operation panel 200 from HDD 14.

When detecting that operation panel 200 is attached, MFP 100b automatically acquires (downloads) the job information of MFP 100a and the image data held by operation panel 200, as shown by the arrow PR1. Then, MFP 100b executes the print job based on the job information acquired from operation panel 200 and outputs paper as shown by the arrow PR2.

Figure 12:
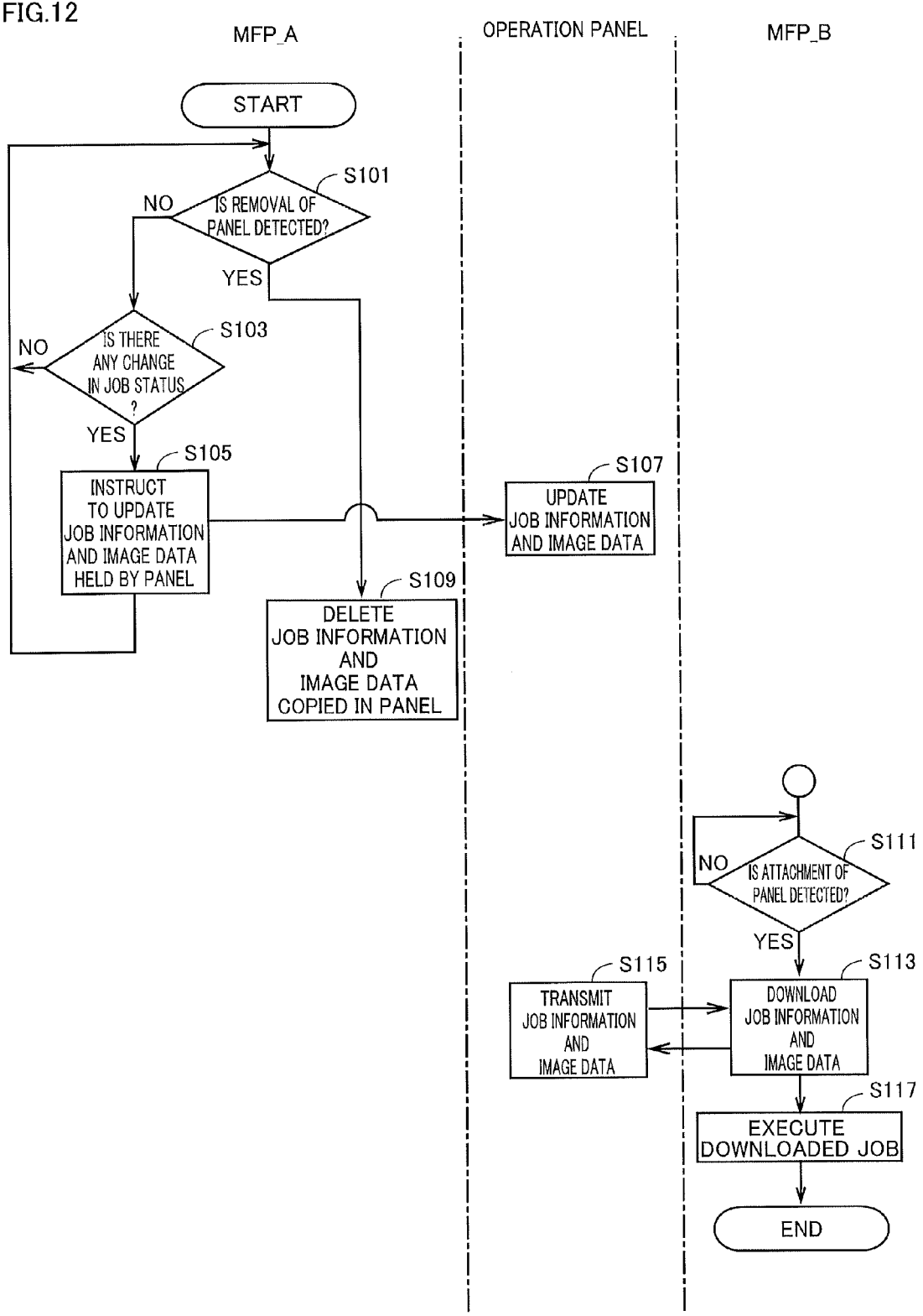
FIG. 12 is a flowchart showing the operation of the image processing system when a job is transferred from MFP 100a to MFP 100b in the third embodiment of the present invention.

FIG. 12 is a flowchart showing the operation of the image processing system when a job is transferred from MFP 100a to MFP 100b in the third embodiment of the present invention.

Referring to FIG. 12, CPU 11a determines whether removal of operation panel 200 from MFP 100a is detected (S101). If it is determined that removal of operation panel 200 is not detected (NO in S101), CPU 11a determines whether there is any change in the job status of MFP 100a (S103).

In step S103, if it is determined that there is a change in the job status (YES in S103), CPU 11a instructs operation panel 200 to update the job information and the image data held by operation panel 200 (S105) and proceeds to the process in step S101. CPU 211 of operation panel 200 updates the job information and the image data in accordance with the instruction from MFP 100a (S107). On the other hand, in step S103, if it is determined that there is no change in the job status (NO in S103), CPU 11a proceeds to the process in step S101.

In step S101, if it is determined that removal of operation panel 200 is detected (YES in S101), CPU 11a deletes the job information and the image data copied in operation panel 200 from HDD 14 of MFP 100a (S109).

CPU 11b determines whether attachment of operation panel 200 to MFP 100b is detected (S111). If it is determined that attachment of operation panel 200 is detected (YES in S111), CPU 11b downloads the job information and the image data from operation panel 200 (S113). CPU 211 transmits the job information and the image data held by operation panel 200 to MFP 100b in accordance with the request from MFP 100b (S115). Then, CPU 11b executes the job based on the downloaded job information and image data (S117) and terminates the process.

It is noted that the matters other than those described above including the configuration of the image processing system are similar as in the first embodiment, and therefore a description thereof is not repeated.

Effects of Embodiments

The foregoing embodiments can provide an image processing system with improved operability.

According to the foregoing embodiments, the user can check a list of jobs accepted by MFP 100a on operation panel 200. When it is determined that transfer of a job is necessary based on the display on operation panel 200, the user can execute the job at another MFP 100b only by removing operation panel 200 used in the determination from MFP 100a and moving to another MFP 100b to attach operation panel 200 to MFP 100b. The user can transfer any given process only by transferring the operation panel without any cumbersome panel operation. As a result, the operability of the image processing system is improved so that anybody can easily perform the operation as to transfer of a job.

The job information held by operation panel 200 is updated based on the job information received by operation panel 200 from MFP 100a via wireless communication. This prevents the same job from being redundantly executed in MFPs 100a and 100b after operation panel 200 is removed from MFP 100a.

Operation panel 200 holds the machine information of MFP 100a. Therefore, when operation panel 200 is attached to MFP 100b, MFP 100b can access MFP 100a based on the machine information and download necessary data from MFP 100a to execute a job.

MFP 100b executes a job of a user different from the user of a job being executed in MFP 100a. Thus, it is possible to prevent the jobs registered by one user from being distributed between MFP 100a and MFP 100b for execution.

Operation panel 200 holds the job information of MFP 100a as in the first to third embodiments. Therefore, even in the state in which operation panel 200 is removed from MFP 100a, a list of jobs accepted by MFP 100a is readily displayed on operation panel 200.

Storage unit 212 of operation panel 200 stores image data necessary for the job waiting to be executed in MFP 100a, as in the third embodiment. Therefore, the job accepted at MFP 100a can also be executed at MFP 100b not connected to network 400.

When MFP 100a executes a job, the image data of that job is deleted from storage unit 212 of operation panel 200, as in the third embodiment. Therefore, space in storage unit 212 is freed, and it is possible to prevent one job from being redundantly executed.

[Others]

In the foregoing first to third embodiments, MFP 100b may execute all the jobs that are waiting to be executed in MFP 100a (in FIG. 5, the jobs having the process IDs "002" to "007"). Alternatively, MFP 100b may selectively execute the job (in FIG. 5, the jobs having the process IDs "006" and "007") designated by a user different from the user who designates the job being executed in MFP 100a, as shown in FIG. 13.

Figure 13:
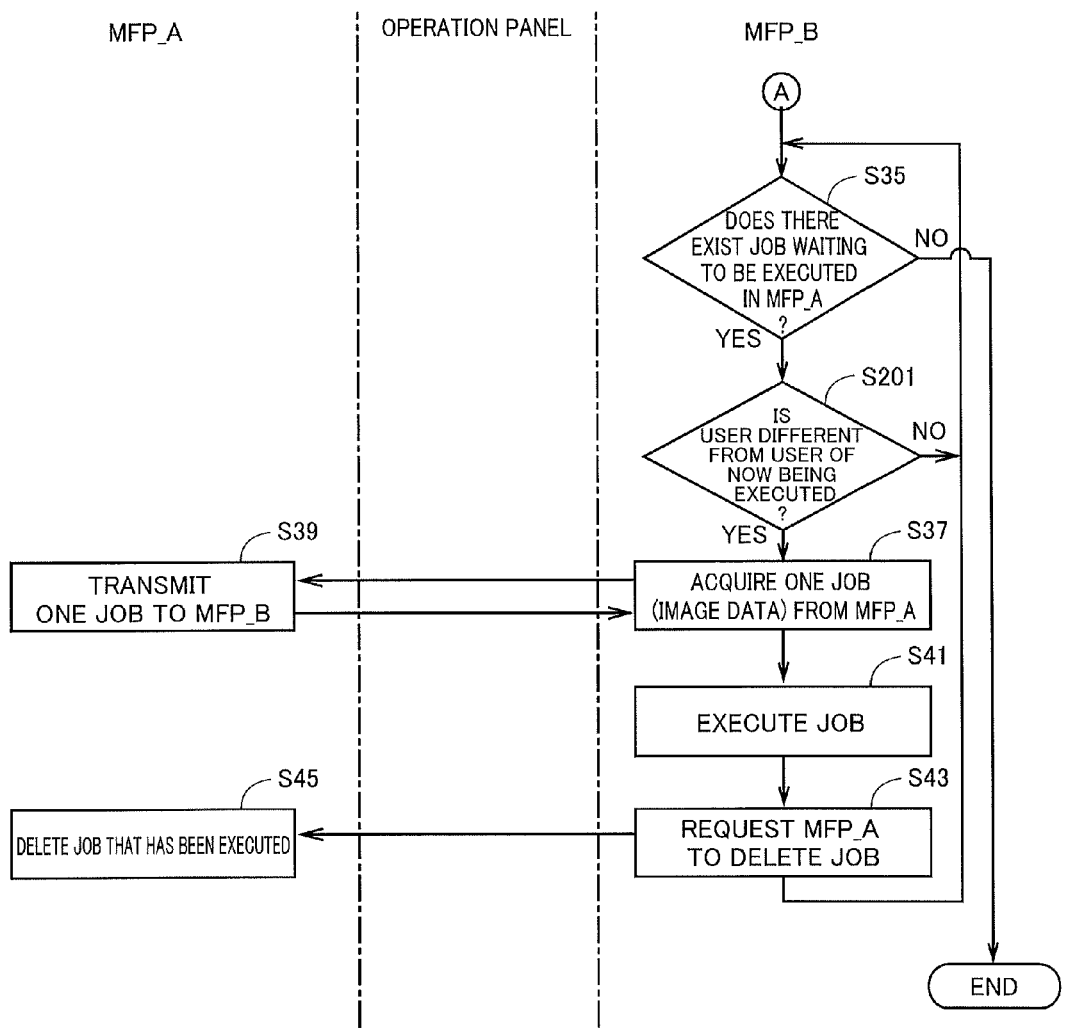
FIG. 13 is a diagram showing a first modification of the flowchart shown in FIG. 7.

FIG. 13 is a flowchart showing a first modification of the flowchart shown in FIG. 7.

Referring to FIG. 13, in step S35, if it is determined that there exists a job waiting to be executed in MFP 100a (YES in S35), CPU 11b determines whether the user of the job waiting to be executed in MFP 100a is different from the user of the job now being executed in MFP 100a (S201). In S201, if it is determined that the user is the different (YES in S201), CPU 11b proceeds to the process in step S37 and acquires the job waiting to be executed in MFP 100a (S37). On the other hand, in step S201, if it is determined that the user is same (NO in S201), CPU 11b does not execute the job waiting to be executed in MFP 100a and proceeds to the process in step S35.

Figure 14:
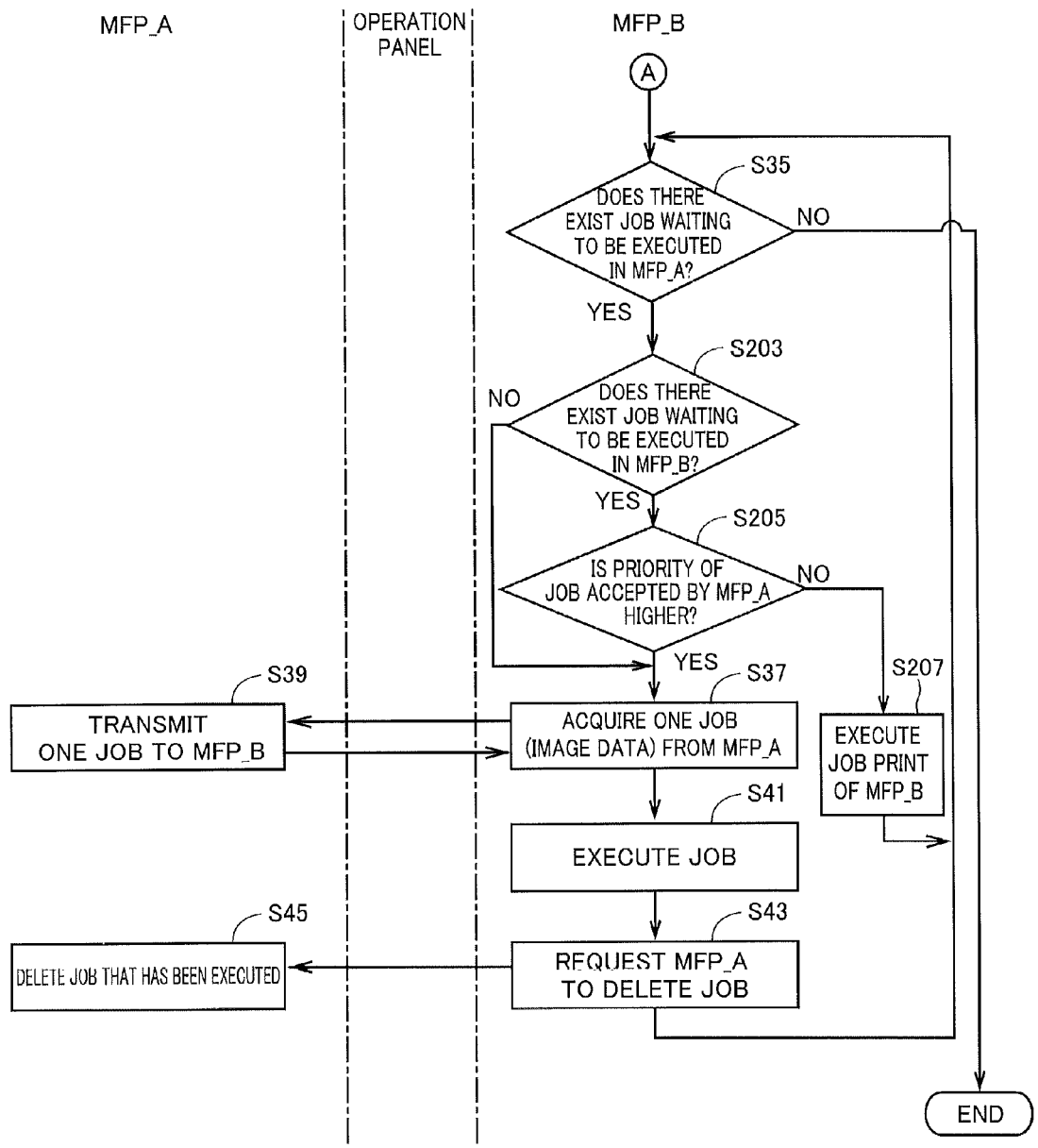
FIG. 14 is a diagram showing a second modification of the flowchart shown in FIG. 7.

In the foregoing first to third embodiments, in the case where operation panel 200 is removed from MFP 100a and attached to MFP 100b, when there exists a job waiting to be executed in MFP 100b, MFP 100b may execute the jobs waiting for print in decreasing order of priority, as shown in FIG. 14.

FIG. 14 is a flowchart showing a second modification of the flowchart shown in FIG. 7.

Referring to FIG. 14, in step S35, if it is determined that there exists a job waiting to be executed in MFP 100a (YES in S35), CPU 11b determines whether there exists a job waiting to be executed in MFP 100b (S203).

In step S203, if it is determined that there exists a job waiting to be executed in MFP 100b (YES in S203), CPU 11b determines whether the priority of the job accepted by MFP 100a is higher than the priority of the job waiting to be executed in MFP 100b (S205).

In step S205, if it is determined that the priority of the job accepted by MFP 100a is higher (YES in S205), CPU 11b proceeds to the process in step S37 and preferentially executes the job accepted by MFP 100a. On the other hand, in step S205, if it is determined that the priority of the job accepted by MFP 100a is lower (NO in S205), CPU 11b proceeds to the process in step S207, preferentially executes the job waiting to be executed in MFP 100b, and proceeds to the process in step S35.

In the foregoing third embodiment, in the case where operation panel 200 is attached to MFP 100a, operation panel 200 does not have to store the job information of MFP 100a and the image data necessary for the job. In this case, when MFP 100a detects that operation panel 200 is removed from MFP 100a, the job information of MFP 100a and the image data necessary for the job may be transferred from MFP 100a to operation panel 200 via wireless communication.

In a case where the image processing system includes devices that execute jobs besides MFPs 100a and 100b, the user may attach operation panel 200 to any given device to which a job is to be transferred.

The job executed by MFP 100b may be any kind including, in addition to a print job described above, for example, a scan job, a copy job, a file transmission job, and a mail transmission job. When a job registered in MFP 100a is transferred to MFP 100b through operation panel 200 and the job is a kind that cannot be executed at MFP 100b, operation panel 200 or MFP 100b may display a message indicating that the job cannot be executed at MFP 100b.

MFP 100*a* or MFP 100*b* may have its own operation panel (local panel), besides operation panel 200. This operation panel may be removable or unremovable.

MFP 100*a* may accept a job directly (not through network 400) from operation panel 200, rather than accepting a job through network 400 from PCs 300*a* to 300*c*. In this case, the image processing system may not include a PC.

The choice of a job to be transferred from MFP 100*a* to MFP 100*b* may be accepted from operation panel 200, and only the selected job may be executed in MFP 100*b*.

The foregoing embodiments may be combined as appropriate. For example, the operation in FIG. 5 may be combined with the operation in FIG. 11 in such a manner that MFP 100*b* downloads the job information held not by operation panel 200 but by MFP 100*a* and executes the job based on this job information.

The process in the foregoing embodiments may be performed by software or using a hardware circuit. A program for executing the process in the foregoing embodiments may be provided, or a recording medium such as a CD-ROM, a flexible disk, a hard disk, a ROM, a RAM, or a memory card encoded with the program may be provided to users. The program is executed by a computer such as a CPU. The program may be downloaded to an apparatus via a communication network such as the Internet.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image processing system comprising a first image processing apparatus, a second image processing apparatus, and a display device,
    said display device being attachable to and removable from each of said first image processing apparatus and said second image processing apparatus,
    said first image processing apparatus including an accepting unit for accepting a job,
    said display device including a storage unit for storing information held by said first image processing apparatus and a display unit for displaying information about a job accepted by said accepting unit,
    said second image processing apparatus including a job execution unit for executing the job accepted by said accepting unit based on the information stored in said storage unit when said display device is removed from said first image processing apparatus and attached to said second image processing apparatus,
    said display device, when being removed from said first image processing apparatus, updating the information about the job stored in said storage unit based on the information about the job received from said first image processing apparatus via wireless communication, and
    said second image processing apparatus, when said display device is attached, acquiring from said storage unit the information about the job which is updated in accordance with execution of the job by said first image processing apparatus, and executing the job based on the acquired information about the job.

2. The image processing system according to claim 1, said display device further including a first operation accepting unit for accepting an operation on said first image processing apparatus, an operation information transmission unit for transmitting information about the operation accepted by said first operation accepting unit to said first image processing apparatus via wireless communication when said display device accepts the operation at said first operation accepting unit in a state in which said display device is removed from said first image processing apparatus, and a second operation accepting unit for accepting an operation on said second image processing apparatus about a job stored in said display device when said display device is attached to said second image processing apparatus.

3. The image processing system according to claim 1, wherein said job execution unit further includes a first image data acquisition unit for acquiring image data necessary for a job, from said first image processing apparatus, based on the job information acquired by said job information acquisition unit.

4. The image processing system according to claim 1, wherein said storage unit stores machine information which is identification information of said first image processing apparatus.

5. The image processing system according to claim 4, wherein said job execution unit includes a machine information acquisition unit for acquiring the machine information stored in said storage unit, and a communication unit for communicating with said first image processing apparatus based on the machine information acquired by said machine information acquisition unit.

6. The image processing system according to claim 1, wherein said job execution unit executes a job of a user different from a user of a job being executed in said first image processing apparatus.

7. The image processing system according to claim 6, wherein said job execution unit executes all jobs that are waiting to be executed in said first image processing apparatus, among jobs accepted by said accepting unit.

8. The image processing system according to claim 1, wherein
    said storage unit stores image data necessary for a job that is waiting to be executed in said first image processing apparatus, among jobs accepted by said accepting unit, and
    said job execution unit includes a second image data acquisition unit for acquiring image data stored in said storage unit.

9. The image processing system according to claim 8, wherein said display device further includes an image data deletion unit for deleting image data of a job executed by said first image processing apparatus from image data stored in said storage unit when said first image processing apparatus executes a job accepted by said accepting unit.

10. The image processing system according to claim 1, wherein when there exists a job waiting to be executed in said second image processing apparatus, said job execution unit preferentially executes the job having a higher priority of the job accepted by said accepting unit and the job waiting to be executed in said second image processing apparatus.

11. A method of controlling an image processing system including a first image processing apparatus, a second image processing apparatus, and a display device, said display device being attachable to and removable from each of said first image processing apparatus and said second image processing apparatus, the method comprising the steps of:
    accepting a job at said first image processing apparatus;
    storing information held by said first image processing apparatus into said display device;
    displaying information about the job accepted in said step of accepting on said display device;
    updating the information about the job in said display device based on the information about the job received from said first image processing apparatus via wireless communication, when the display device is removed from said first image processing apparatus;

acquiring from said display device the information about the job which is updated in accordance with execution of the job by said first image processing apparatus, when said display device is attached to said second image processing apparatus; and executing the job, accepted in said step of accepting, at said second image processing apparatus based on the acquired information about the job, when said display device is removed from said first image processing apparatus and attached to said second image processing apparatus.

* * * * *